(12) United States Patent
Fujisawa (10) Patent No.: US 7,352,726 B2
(45) Date of Patent: Apr. 1, 2008

(54) COMMUNICATION DEVICE, COMMUNICATION METHOD AND PROGRAM FOR PACKET COMMUNICATIONS BETWEEN TWO NETWORKS THAT CONFORM TO DIFFERENT STANDARDS

(75) Inventor: Kenji Fujisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1074 days.

(21) Appl. No.: 10/223,529

(22) Filed: Aug. 19, 2002

(65) Prior Publication Data

US 2003/0039260 A1 Feb. 27, 2003

(30) Foreign Application Priority Data

Aug. 21, 2001 (JP) .......................... P2001-250901

(51) Int. Cl.
*H04Q 7/24* (2006.01)
*H04L 12/28* (2006.01)
*H04J 3/24* (2006.01)

(52) U.S. Cl. ..................... 370/338; 370/401; 370/475
(58) Field of Classification Search ................ 370/338, 370/401, 474–476
See application file for complete search history.

(56) References Cited

U.S. PATENT DOCUMENTS

| 5,732,071 A * | 3/1998 | Saito et al. ................. 370/255 |
| 6,505,255 B1 * | 1/2003 | Akatsu et al. .............. 709/239 |
| 6,522,654 B1 * | 2/2003 | Small .......................... 370/400 |
| 6,751,221 B1 * | 6/2004 | Saito et al. ................. 370/392 |
| 6,977,939 B2 * | 12/2005 | Joy et al. .................... 370/401 |
| 2002/0080755 A1 * | 6/2002 | Tasman et al. ............. 370/338 |
| 2002/0093964 A1 * | 7/2002 | Yik et al. ................... 370/400 |

\* cited by examiner

*Primary Examiner*—Wing Chan
*Assistant Examiner*—Hong Sol Cho
(74) *Attorney, Agent, or Firm*—Frommer Lawrence & Haug LLP; William S. Frommer; Thomas F. Presson (57) ABSTRACT

A communication device, a communication method and a program can connect two different networks to form a single network without wasting MAC addresses. Address preparing section 15 prepares a pseudo MAC address that corresponds to the node ID stored in the origin ID field 142 and the offset stored in the destination offset field 143 of the received packet and stores it in an IEEE 1394—Ethernet conversion table 62. At this time, the address preparing section 15 prepares the pseudo MAC address B by changing the IP address B of the IEEE 1394 terminal 6 stored in the origin IP address field 133 from a decimal number to a hexadecimal number and localizing the L-bit.

8 Claims, 8 Drawing Sheets

ETHERNET-IEEE 1394 CONVERSION TABLE 61

| MAC ADDRES | PROXY OFFSET |
|---|---|
| A1 | a1 |
| A2 | a2 |
| A3 | a3 |
| A4 | a4 |
| ⋮ | ⋮ |

FIG.9

IEEE 1394-ETHERNET CONVERSION TABLE 62

| NODE ID | OFFSET | MAXIMUM PAYLOAD | COMMUNICATION SPEED | UNIQUE ID | PSEUDO MAC ADDRESS |
|---|---|---|---|---|---|
| b1 | c1 | d1 | e1 | f1 | B1 |
| b2 | c2 | d2 | e2 | f2 | B2 |
| b3 | c3 | d3 | e3 | f3 | B3 |
| b4 | c4 | d4 | e4 | f4 | B4 |
| ⋮ | ⋮ | ⋮ | ⋮ | ⋮ | ⋮ |

COMMUNICATION DEVICE, COMMUNICATION METHOD AND PROGRAM FOR PACKET COMMUNICATIONS BETWEEN TWO NETWORKS THAT CONFORM TO DIFFERENT STANDARDS

BACKGROUND OF THE INVENTION

1. Field of the Invention

This invention relates to a communication device and a communication method to be used for packet communications between two networks that conform to respective standards that are different from each other. The present invention also relates to a program to be used for such packet communications.

2. Description of Related Art

Currently, LANs (local area networks) are in operation to a limited extent. With LANs, computer terminals can communicate with each other and transmit data and images. The existing LANs include IEEE 802 networks, or so-called Ethernet (trademark) networks, that conforms to the IEEE (Institute of Electrical and Electronics Engineers) 802 Standard.

With an Ethernet network, communications are controlled according to the TCP/IP (Transport Control Protocol/Internet Protocol). An IP address is assigned to each computer terminal either manually by the network controller or automatically by DHCP (Dynamic Host Configuration Protocol). Data are transmitted and received on the basis of assigned IP addresses. However, a physical address (inherent address), or MAC (media access control) address, that corresponds to the IP address is required to realize a data transmission. The MAC address is the address number assigned to the NIC (network interface card) of the computer terminal, which is the interface equipment of the computer terminal. The computer terminal uses both the IP address and the MAC address for communications.

Communication devices for connecting networks include bridges adapted to connect LAN segments by way of the data link layer, which is the second layer, and routers adapted to connect LANs by way of the network layer, which is the third layer.

If an Ethernet network and a network other than an Ethernet network, e.g., an IEEE 1394 network that conforms to the IEEE 1394 Standard, are involved, the bridge can connect the Ethernet network and the IEEE 1394 network to produce a single network for relaying data.

However, if a computer terminal is connected to the IEEE 1394 network, the computer terminal does not have a MAC address, while the computer terminals on the IEEE 802 network are provided with a MAC address.

To cope with this problem, the bridge holds in advance a number of MAC addresses that can be used when connecting an Ethernet network and an IEEE 1394 network and assigns one of the MAC addresses to the computer terminal on the IEEE 1394 network for relaying data.

On the other band, the router interprets the header of the IP address of the computer terminal by referring to the routing table when connecting the Ethernet network and the IEEE 1394 network for relaying data.

Thus, the bridge needs to hold MAC addresses as many as the number of computer terminals that can be connected to the IEEE 1394 network. However, if the number of computer terminals that are actually connected to the IEEE 1394 network is smaller than the number of MAC addresses the bridge holds, the remaining MAC addresses are held by the bridge for nothing.

On the other hand, when the router connects the Ethernet network and the IEEE 1394 network, an IP subnet has to be assigned to the IEEE 1394 network to waste some of the limited IP address space. Additionally, since the router segments the scope of broadcast or multicast (broadcast to a specific group), there can arise a problem that it is difficult for a computer terminal on the Ethernet network to detect a specific computer terminal on the IEEE 1394 network (device discovery).

BRIEF SUMMARY OF THE INVENTION

In view of the above identified circumstances, it is therefore the object of the present invention to provide a communication device, a communication method and a program that can connect two different networks to form a single network without wasting MAC addresses.

In an aspect of the invention, there is provided a communication device adapted to packet communications between a first terminal connected to a first network and a second terminal connected to a second network, said device comprising: a physical address preparing means for preparing the physical address of said first terminal or that of said second terminal on the basis of the theoretical address assigned to said first terminal or said second terminal, whichever appropriate, and stored in the received packet; a memory means for storing the physical address prepared by said physical address preparing means; and a packet preparing means for preparing a new packet storing said physical address memorized in said memory means.

In another aspect of the invention, there is provided a communication method adapted to packet communications between a first terminal connected to a first network and a second terminal connected to a second network, said method comprising: a physical address preparing step of preparing the physical address of said first terminal or that of said second terminal on the basis of the theoretical address assigned to said first terminal or said second terminal, whichever appropriate, and stored in the received packet; a storage controlling step of causing a memory means to memorize the physical address prepared in said physical address preparing step; and a packet preparing step of preparing a new packet storing said physical address memorized in said memory means in said storage controlling step.

In still another aspect of the invention, there is provided a program for causing a communication device adapted packet communications between a first terminal connected to a first network and a second terminal connected to a second network to execute: a physical address preparing step of preparing the physical address of said first terminal or that of said second terminal on the basis of the theoretical address assigned to said first terminal or said second terminal, whichever appropriate, and stored in the received packet; a storage controlling step of causing a memory means to memorize the physical address prepared in said physical address preparing step; and a packet preparing step of preparing a new packet storing said physical address memorized in said memory means in said storage controlling step.

As described above, a communication device according to the invention is adapted to prepare a physical address on the basis of the theoretical address of the first terminal connected to a first network or that of the second terminal connected to a second network as stored in the received packet. Therefore, it is no longer necessary to constantly hold a large number of physical addresses that may be simply wasted. Additionally, if there is another communication device other than the communication device according to the invention, the latter can assign a same physical address to the single first terminal or second terminal without communicating with the former communication device in a specific way.

A communication method according to the invention is adapted to prepare a physical address on the basis of the theoretical address of the first terminal connected to a first network or that of the second terminal connected to a second network as stored in the packet received by a communication device according to the invention. Therefore, it is no longer necessary to constantly hold a large number of physical addresses that may be simply wasted.

Similarly, a program according to the invention is adapted to prepare a physical address on the basis of the theoretical address of the first terminal connected to a first network or that of the second terminal connected to a second network as stored in the packet received by a communication device according to the invention. Therefore, it is no longer necessary to constantly bold a large number of physical addresses that may be simply wasted.

BRIEF DESCRIPTION OF THE SEVERAL VIEWS OF THE DRAWING

FIGS. 5A and 5B are schematic illustrations of an ARP request packet transmitted from an Ethernet subnetwork, for which the bridge of FIG. 1 relays data.

FIGS. 6A and 6B are schematic illustrations of an ARP response packet transmitted from an IEEE 1394 subnetwork, for which the bridge of FIG. 1 relays data.

FIGS. 7A and 7B are schematic illustrations of an ARP request packet transmitted from an IEEE 1394 subnetwork, for which the bridge of FIG. 1 relays data.

FIGS. 8A and 8B are schematic illustrations of an ARP response packet transmitted from an Ethernet subnetwork, for which the bridge of FIG. 1 relays data.

DETAILED DESCRIPTION OF THE INVENTION

Now, the present invention will be described in greater detail by referring to the accompanying drawings that illustrate a preferred embodiment of the invention, which is applied to a bridge for connecting two different networks to form a single network.

The bridge comprises an address preparing section operating as physical address preparing means for preparing a physical address of the first terminal or the second terminal on the basis of the theoretical address that is stored in the received packed and assigned to the first terminal or the second terminal, whichever appropriate, a memory operating as memory means for memorizing the physical address prepared by the physical address preparing means and a packet preparing section operating as packet preparing means for preparing a new packet storing the physical address memorized in the memory means.

Figure 1:
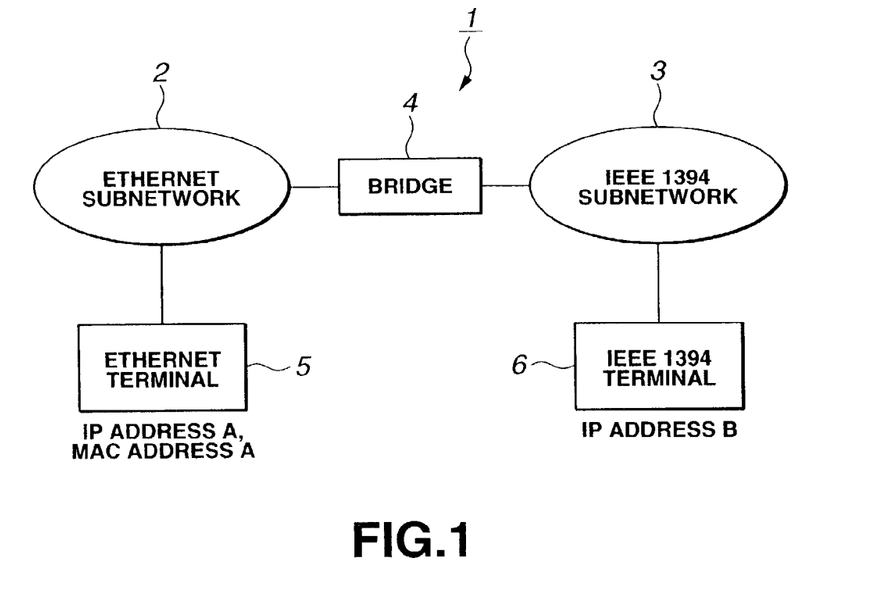
FIG. 1 is a schematic illustration of networks connected to each other by way of an embodiment of bridge according to the invention.

Firstly, the configuration of the network 1 that includes the embodiment applied to the bridge will be summarily described below by referring to FIG. 1. As shown in FIG. 1, the network 1 comprises an IEEE 802 subnetwork conforming to the IEEE (Institute of Electrical and Electronics Engineers) 802 Standard, or so-called Ethernet (trademark) subnetwork 2, an IEEE 1394 subnetwork 3 conforming to the IEEE 1394 Standard, a bridge 4 connecting the Ethernet subnetwork 2 and the IEEE 1394 subnetwork 3, an Ethernet terminal 5 which is shown as one of the computer terminals connected to the Ethernet subnetwork 2 and an IEEE 1394 terminal 6 which is also shown as one of the computer terminals connected to the IEEE 1394 subnetwork 3.

With the above described network 1, communications are controlled according to the TCP/IP (Transport Control Protocol/Internet Protocol). For example, IPv4 address (to be referred to simply as IP address hereinafter) A may be assigned to the Ethernet terminal 5, while IP address B may be assigned to the IEEE 1394 terminal 6. Additionally, MAC (media access control) address A that is a physical address (inherent address) is assigned to the NIC (network interface card), or so-called LAN card, that the Ethernet terminal 5 comprises.

Figure 2:
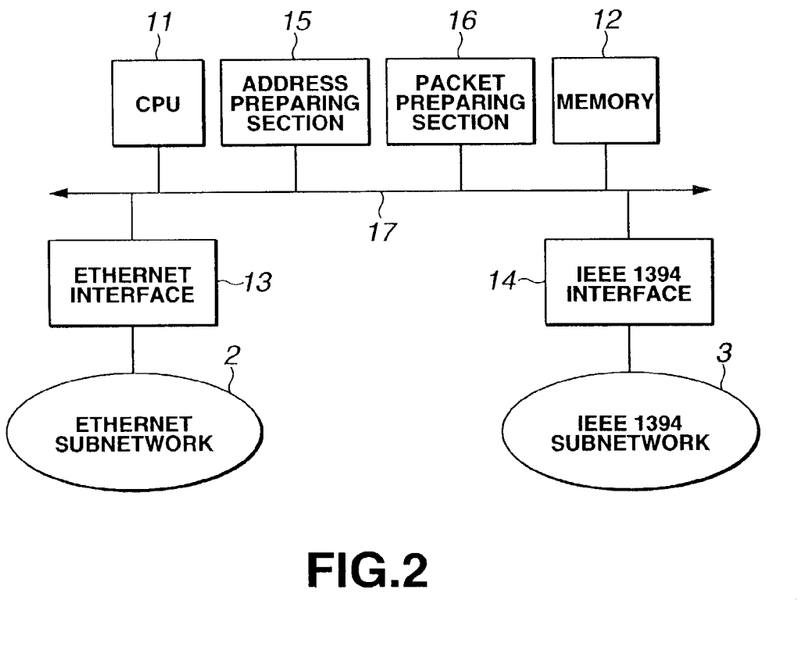
FIG. 2 is a schematic illustration of the configuration of the bridge of FIG. 1.

Next, the configuration of the bridge 4 will be summarily described below by referring to FIG. 2. The bridge 4 comprises a CPU (central processing unit) 11, a memory 12, an Ethernet interface 13, an IEEE 1394 interface 14, an address preparing section 15, a packet preparing section 16 and a bus 17.

The CPU 11 controls the overall operation of the bridge 4, executing the program stored in the memory 12. The address preparing section 15 prepares a pseudo MAC address on the basis of the IP address B of the IEEE 1394 terminal 6 stored in the ARP (address resolution protocol) packet that is supplied from the Ethernet interface 13 or the IEEE 1394 interface 14. The packet preparing section 16 prepares a new ARP packet, transforming a system format of the received ARP packet.

The memory 12 is typically a RAM (random access memory) and memorizes data necessary for the CPU 11 to execute the program. The data include the pseudo MAC address prepared by the address preparing section 15.

The Ethernet interface 13 is connected to the Ethernet subnetwork 2. It outputs the ARP packet supplied from the Ethernet subnetwork 2 to the address preparing section 15. It also outputs the new ARP packet supplied from the packet preparing section 16 to the Ethernet subnetwork 2.

The IEEE 1394 interface 14 is connected to the IEEE 1394 subnetwork 3. It outputs the ARP packet supplied from the IEEE 1394 subnetwork 3 to the address preparing section 15. It also outputs the new ARP packet supplied from the packet preparing section 16 to the IEEE 1394 subnetwork 3.

The bus 17 interconnects the CPU 11, the memory 12, the Ethernet interface 13, the IEEE 1394 interface 14, the address preparing section 15 and the packet preparing section 16.

Figure 3:
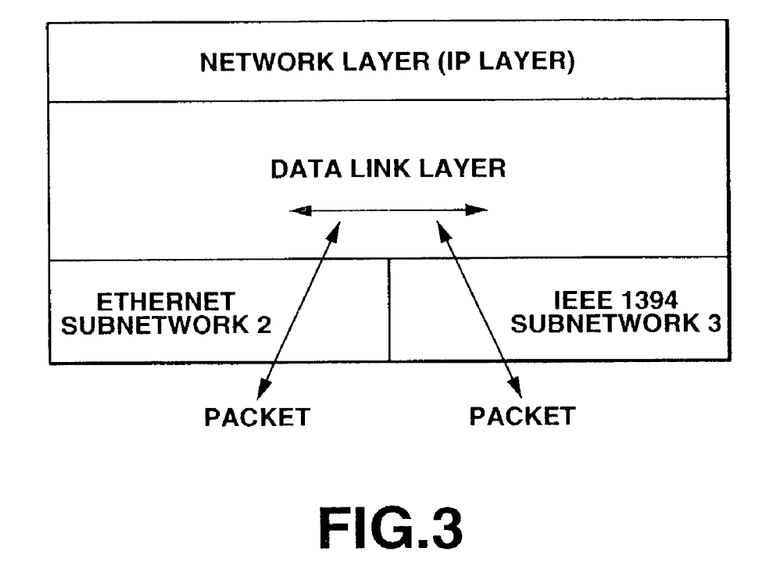
FIG. 3 is a schematic illustration of the processing layer in which the bridge of FIG. 1 transforms an ARP packet.

Now, the processing layers in which the bridge 4 transforms the ARP packet transmitted from the Ethernet terminal 5 or the IEEE 1394 terminal 6 will be described below by referring to FIG. 3. The bridge 4 transforms the ARP packet transmitted from the Ethernet subnetwork 2 into a predetermined system format in the data link layer and transmits it to the IEEE 1394 subnetwork 3. Similarly, the bridge 4 transforms the ARP packet transmitted from the IEEE 1394 subnetwork 3 into a predetermined system format in the data link layer and transmits it to the Ethernet subnetwork 2. The IP layer that corresponds to the network layer is used to control the bridge 4, although it may be omitted.

Figure 4:
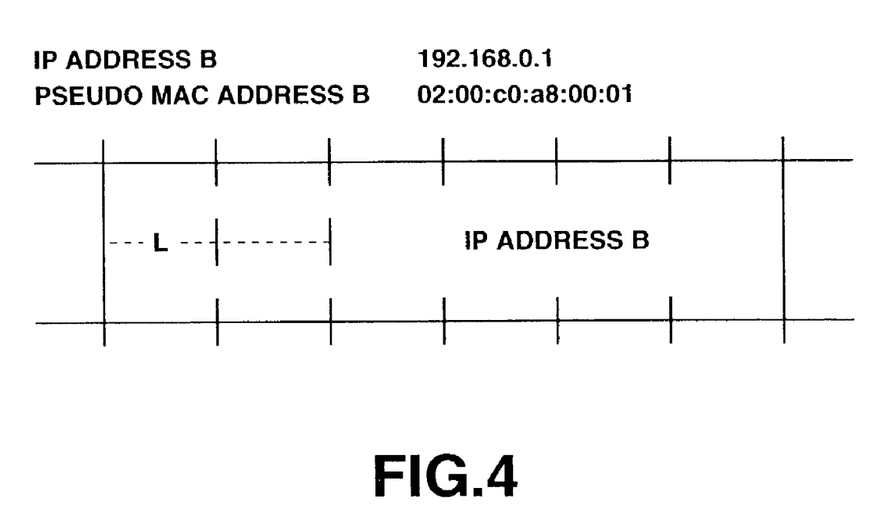
FIG. 4 is a schematic illustration of a pseudo MAC address that the bridge of FIG. 1 prepares from the IP address of an IEEE 1394 terminal.

Next, the pseudo MAC address B prepared by the address preparing section 15 of the bridge 4 will be described below as an example of pseudo MAC address by referring to FIG. 4. An IP address is expressed by 32 bits of a decimal number, which is divided into four 8 bits (octets). A MAC address is expressed by 48 bits of a hexadecimal number, which is divided into six 8 bits (octets).

If the IP address B of the IEEE 1394 terminal is 192.168.0.1, the address preparing section 15 converts the octets of the IP address B expressed by respective decimal numbers into so may hexadecimal numbers and allocates them to the 3rd through 6th octets of the pseudo MAC address B.

The first octet of the pseudo MAC address B has an L-bit that is used to discriminate a universal MAC address that is unique in the whole world and a MAC address that is a local address assigned in the segment. The L-bit indicates a universal MAC address if it is equal to 0, whereas it indicates a local MAC address if it is equal to 2.

Thus, the address preparing section 15 prepares the pseudo MAC address B of 02:00:c0:a8:00:01 by making the L-bit equal to 2 so as to prevent it from being a duplicate of some other MAC address.

Now, an ARP packet that the packet preparing section 16 of the bridge 4 prepares will be described below. An ARP packet may be an ARP request packet to be transmitted or an ARP response packet that is a response to the ARP request packet.

Figure 5A:
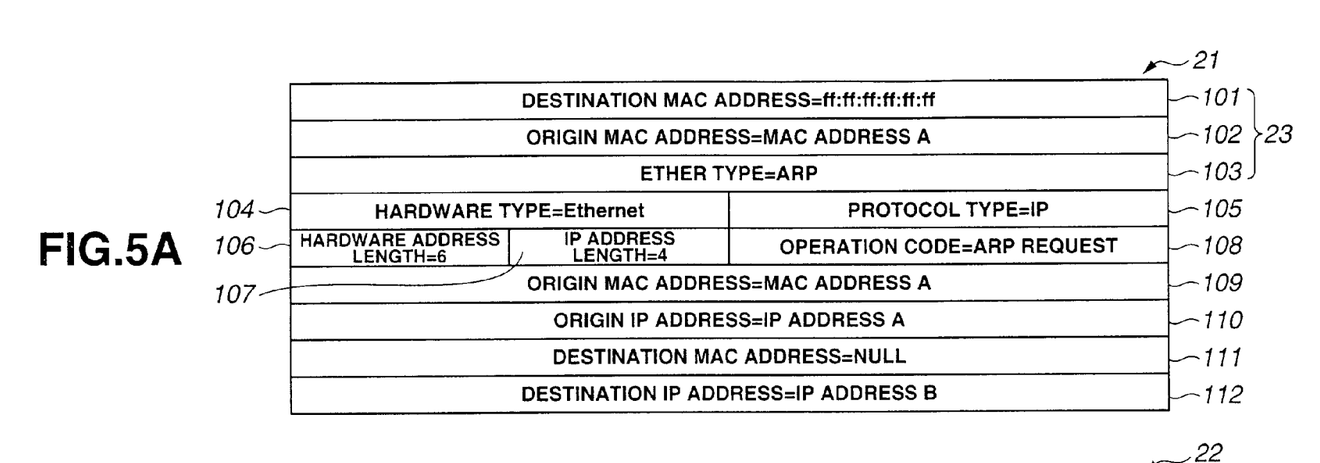
FIG. 5A illustrates the structure of a first ARP request packet that an Ethernet terminal broadcasts and FIG. 5B illustrates the structure of a second ARP request packet newly prepared on the basis of the first ARP request packet.
Figure 5B:
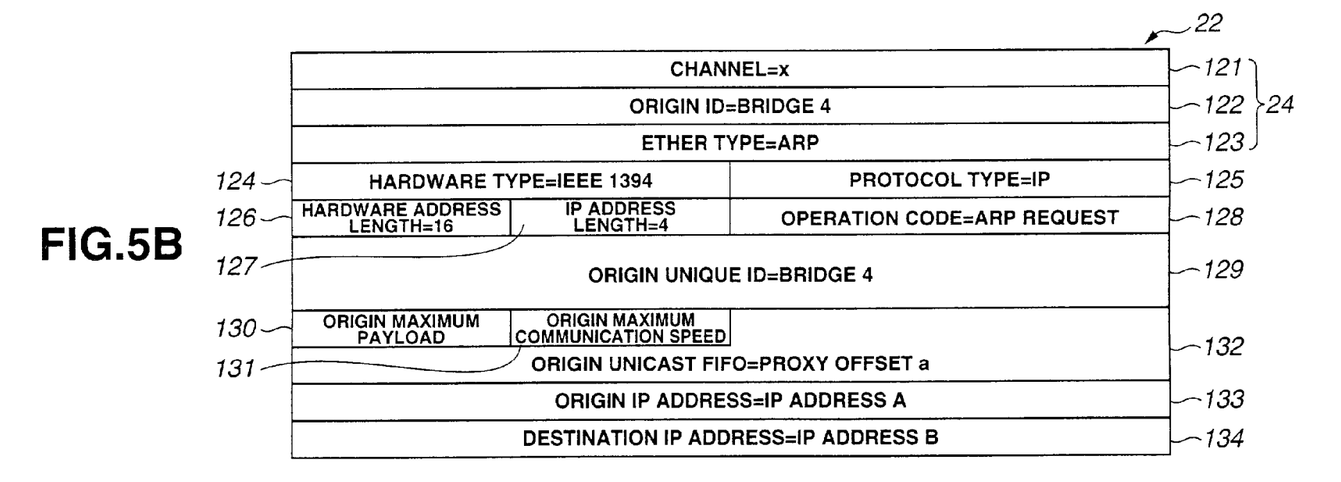

Firstly, an ARP request packet transmitted from the Ethernet subnetwork 2, to which the bridge 4 relays data, will be described by referring to FIGS. 5A and 5B. The first ARP request packet 21 that the Ethernet terminal 5 broadcasts may typically have a structure as shown in FIG. 5A. On the other hand, the second ARP request packet 22 that the packet preparing section 16 of the bridge 4 newly prepares on the basis of the first ARP request packet 21 received by the Ethernet interface 13 of the bridge 4 may typically have a structure as shown in FIG. 5B. The IEEE 1394 interface 14 of the bridge 4 broadcasts the second ARP request packet 22 to the IEEE 1394 subnetwork 3.

As shown in FIG. 5A, the first ARP request packet 21 includes a destination MAC address field 101, an origin MAC address field 102, an Ether type field 103, a hardware type field 104, a protocol type field 105, a hardware address length field 106, an IP address length field 107, an operation code field 108, an origin MAC address field 109, an origin IP address field 110, a destination MAC address field 111 and a destination IP address field 112, which are transmitted in the above mentioned order. Note that the destination MAC address field 101, the origin MAC address field 102 and the Ether type field 103 constitute the Ethernet header 23 that is transmitted and received through the Ethernet subnetwork 2.

The destination MAC address field 101 is expressed by 48 bits and stores "ff:ff:ff:ff:ff:ff" that indicates broadcast. The origin MAC address field 102 is expressed by 48 bits and stores the MAC address A of the origin Ethernet terminal 5. The Ether type field 103 is expressed by 16 bits and stores a data indicating ARP.

The hardware type field 104 is expressed by 16 bits and stores a data indicating that the packet conforms to the Ethernet Standard. The protocol type field 105 is expressed by 16 bits and stores a data indicating IP. The hardware address length field 106 is expressed by 8 bits and stores 6 as data indicating the length of the hardware address. The IP address length field 107 is expressed by 8 bits and stores 4 as data indicating the length of the IP address. The operation code field 108 is expressed by 16 bits and stores a code indicating the ARP request.

The origin MAC address field 109 is expressed by 48 bits and stores the MAC address A of the origin Ethernet terminal 5. The origin IP address field 110 is expressed by 32 bits and stores the IP address A of the origin Ethernet terminal 5. The destination MAC address field 111 is expressed by 48 bits and stores NULL because the packet is an ARP request packet. The destination IP address field 112 is expressed by 32 bits and stores the IP address B of the destination IEEE 1394 terminal 6.

On the other hand, the second ARP request packet 22 shown in FIG. 5B includes a channel field 121, an origin ID field 122, an Ether type field 123, a hardware type field 124, a protocol type field 125, a hardware address length field 126, an IP address length field 127, an operation code field 128, an origin unique ID field 129, an origin maximum payload field 130, an origin maximum transmission speed field 131, an origin unicast FIFO field 132, an origin IP address field 133 and a destination IP address field 134, which are transmitted in the above mentioned order. Note that the channel field 121, the origin ID field 122 and the Ether type field 123 constitute the first IEEE 1394 header 24 of the packet that is transmitted and received through the IEEE 1394 subnetwork 3.

The channel field 121 is expressed by 6 bits and stores the number of the channel through which the second ARP request packet 21 is broadcasted, which may be x for instance. The origin ID field 122 is expressed by 16 bits and stores the node ID of the bridge 4 to be used for broadcasting the second ARP request packet 22. The node ID is a 16-bit ID for discrimination that is automatically assigned on the IEEE 1394 network. The Ether type field 123 is expressed by 16 bits and stores a data indicating ARP.

The hardware type field 124 is expressed by 16 bits and stores a data indicating that the packet conforms to the IEEE 1394 Standard. The protocol type field 125 is expressed by 16 bits and stores a data indicating IP. The hardware address length field 126 is expressed by 8 bits and stores 16 as data indicating the length of the hardware address. The IP address length field 127 is expressed by 8 bits and stores 4 as data indicating the length of the IP address. The operation code field 128 is expressed by 16 bits and stores a code indicating the ARP request.

The origin unique ID field 129 is expressed by 64 bits and stores the unique ID of the bridge 4. A unique ID is an ID that is inherent in each computer terminal connected to the IEEE 1394 network 3 and does not change its value. The origin maximum payload field 130 is expressed by 8 bits and stores the maximum payload of the bridge 4. The origin maximum transmission speed field 131 is expressed by 8 bits and stores a code indicating the maximum transmission speed of the bridge 4. The origin unicast FIFO field 132 is expressed by 48 bits and stores the proxy offset a generated by the bridge 4 with the corresponding MAC address A.

The origin IP address field 133 is expressed by 32 bits and stores the IP address A of the origin Ethernet terminal 5. The destination IP address field 134 is expressed by 32 bits and stores the IP address B of the destination IEEE 1394 terminal 6.

Figure 6A:
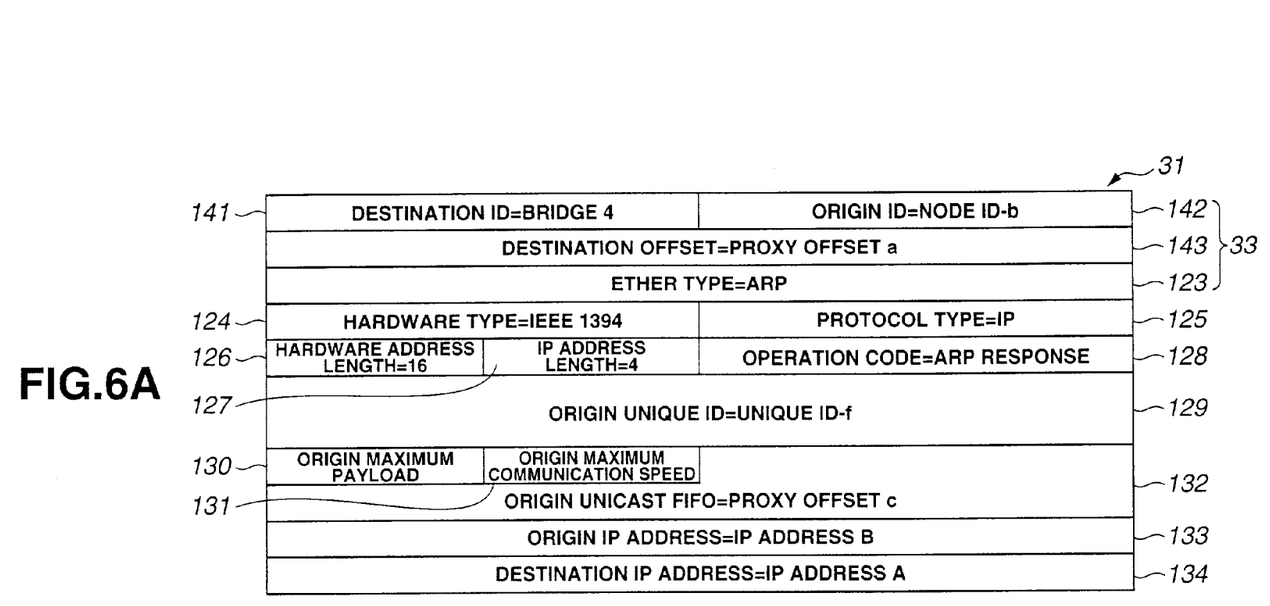
FIG. 6A illustrates the structure of a first ARP response packet that an IEEE 1394 terminal transmits in response to a second ARP request packet and FIG. 6B illustrates the structure of a second response packet newly prepared on the basis of the first ARP response packet.
Figure 6B:
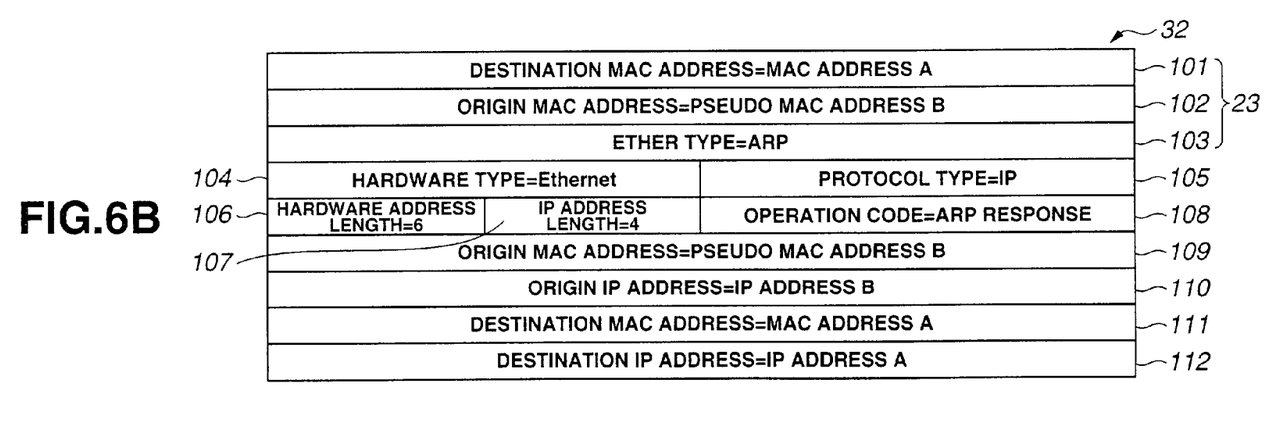

Now, the ARP response packet from the IEEE 1394 subnetwork 3, for which the bridge 4 relays data, will be described below by referring to FIGS. 6A and 6B. FIG. 6A illustrates the structure of the first ARP response packet 31 transmitted from the IEEE 1394 terminal 6 upon receiving the second ARP request packet 22. On the other hand, the second ARP response packet 32 that the packet preparing section 16 of the bridge 4 newly prepares on the basis of the first ARP response packet 31 received by the IEEE 1394 interface 14 of the bridge 4 may typically have a structure as shown in FIG. 6B. The Ethernet interface 13 of the bridge 4 transmits the second ARP response packet 32 to the Ethernet terminal 5.

As shown in FIG. 6A, the first ARP response packet 31 includes a destination ID field 141, an origin ID field 142, a destination offset field 143, an Ether type field 123, a hardware type field 124, a protocol type field 125, a hardware address length field 126, an IP address length field 127, an operation code field 128, an origin unique ID field 129, an origin maximum payload field 130, an origin maximum communication speed field 131, an origin unicast FIFO field 132, an origin IP address field 133 and a destination IP address field 134, which are transmitted in the above mentioned order. Note that the destination ID field 141, the origin ID field 142, the destination offset field 143 and the Ether type field 123 constitute the second IEEE 1394 header 33 of the packet that requests writing a data block in a predetermined node as defined by the IEEE 1394 Standard.

The destination ID field 141 is expressed by 16 bits and stores the node ID of the bridge 4. The origin ID field 142 is expressed by 16 bits and stores the node ID-b of the origin IEEE 1394 terminal 6. The destination offset field 143 is expressed by 48 bits and stores the proxy offset a. The Ether type field 123 is expressed by 16 bits and stores a data indicating ARP.

The hardware type field 124 is expressed by 16 bits and stores a data indicating that the packet conforms to the IEEE 1394 Standard. The protocol type field 125 is expressed by 16 bits and stores a data indicating IP. The hardware address length field 126 is expressed by 8 bits and stores 16 as data indicating the length of the hardware address. The IP address length field 127 is expressed by 8 bits and stores 4 as data indicating the length of the IP address. The operation code field 128 is expressed by 16 bits and stores a code indicating the ARP response.

The origin unique ID field 129 is expressed by 64 bits and stores the unique ID-f of the origin IEEE 1394 terminal 6. The origin maximum payload field 130 is expressed by 8 bits and stores the maximum payload of the origin IEEE 1394 terminal 6. The origin maximum communication speed field 131 is expressed by 8 bits and stores a code indicating the maximum communication speed of the origin IEEE 1394 terminal 6. The origin unicast FIFO field 132 is expressed by 48 bits and stores the predetermined offset c of the origin IEEE 1394 terminal 6.

The origin IP address field 133 is expressed by 32 bits and stores the IP address B of the origin IEEE 1394 terminal 6. The destination IP address field 134 is expressed by 32 bits and stores the IP address A of the destination Ethernet terminal 5.

On the other hand, the second ARP response packet 32 shown in FIG. 6B includes a destination MAC address field 101, an origin MAC address field 102, an Ether type field 103, a hardware type field 104, a protocol type field 105, a hardware address length field 106, an IP address length field 107, an operation code field 108, an origin MAC address field 109, an origin IP address field 110, a destination MAC address field 111 and a destination IP address field 112, which are transmitted in the above mentioned order.

The destination MAC address field 101 is expressed by 48 bits and stores the MAC address A of the destination Ethernet terminal 5. The origin MAC address field 102 is expressed by 48 bits and stores the pseudo MAC address B of the IEEE 1394 terminal 6 prepared by the address preparing section 15 of the bridge 4. The Ether type field 103 is expressed by 16 bits and stores a data indicating ARP.

The hardware type field 104 is expressed by 16 bits and stores a data indicating that the packet conforms to the Ethernet Standard. The protocol type field 105 is expressed by 16 bits and stores a data indicating IP. The hardware address length field 106 is expressed by 8 bits and stores 6 as data indicating the length of the hardware address. The IP address length field 107 is expressed by 8 bits and stores 4 as data indicating the length of the IP address. The operation code field 108 is expressed by 16 bits and stores a code indicating the ARP response.

The origin MAC address field 109 is expressed by 48 bits and stores the pseudo MAC address B of the origin IEEE 1394 terminal 6. The origin IP address field 110 is expressed by 32 bits and stores the IP address B of the origin IEEE 1394 terminal 6. The destination MAC address field 111 is expressed by 48 bits and stores the MAC address A of the destination Ethernet terminal 5. The destination IP address field 112 is expressed by 32 bits and stores the IP address A of the destination Ethernet terminal 5.

Figure 7A:
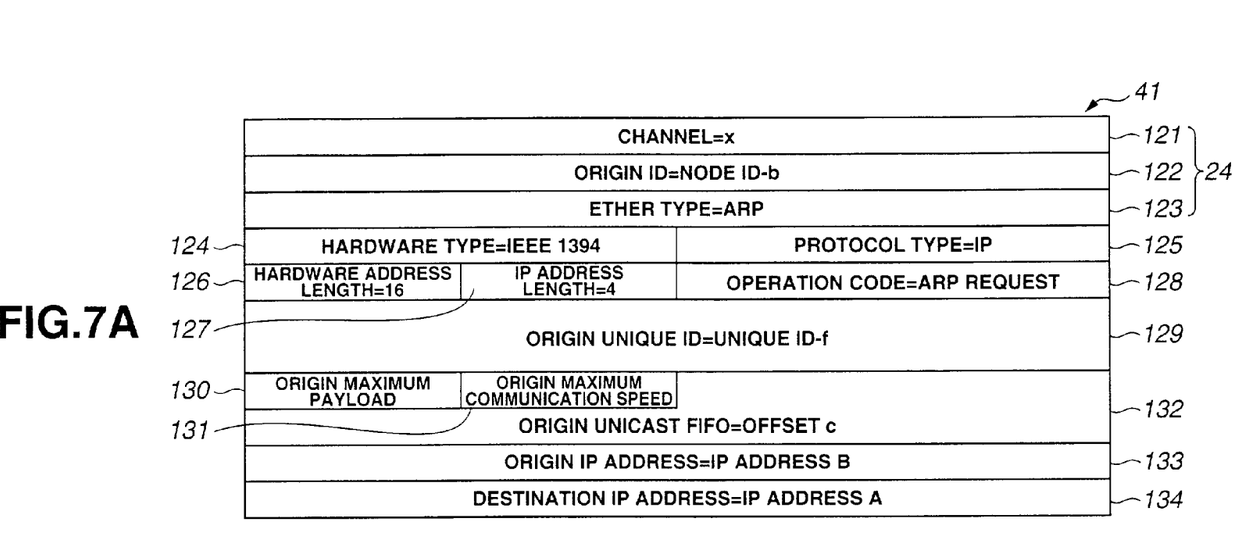
FIG. 7A illustrates the structure of a third ARP request packet that an IEEE 1394 terminal broadcasts and FIG. 7B illustrates the structure of a fourth ARP request packet newly prepared on the basis of the third ARP request packet.
Figure 7B:
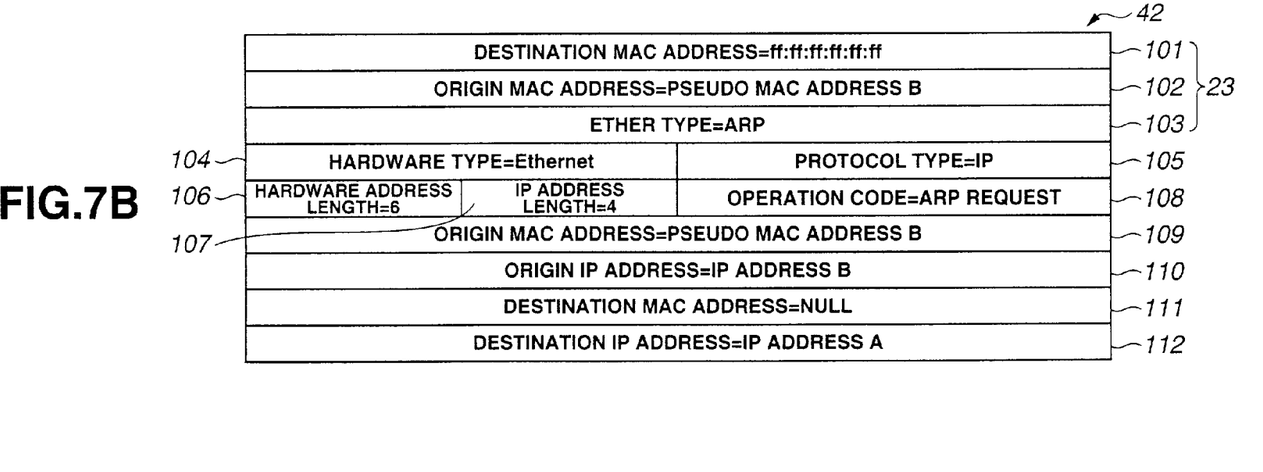

Next, an ARP request packet transmitted from the IEEE 1394 subnetwork 3, for which the bridge 4 relays data, will be described by referring to FIGS. 7A and 7B. The third ARP request packet 41 that the IEEE 1394 terminal 6 broadcasts may typically have a structure as shown in FIG. 7A. On the other hand, the fourth ARP request packet 42 that the packet preparing section 16 newly prepares on the basis of the third ARP request packet 41 received by the IEEE 1394 interface 14 of the bridge 4 may typically have a structure as shown in FIG. 7B. The Ethernet interface 13 of the bridge 4 broadcasts the fourth ARP request packet 42 to the Ethernet subnetwork 2.

The third ARP request packet 41 shown in FIG. 7A includes a channel field 121, an origin ID field 122, an Ether type field 123, a hardware type field 124, a protocol type field 125, a hardware address length field 126, an IP address length field 127, an operation code field 128, an origin unique ID field 129, an origin maximum payload field 130, an origin maximum communication speed field 131, an origin unicast FIFO field 132, an origin IP address field 133 and a destination IP address field 134, which are transmitted in the above mentioned order.

The channel field 121 is expressed by 6 bits and stores the number of the predetermined channel, which may be x for instance. The origin ID field 122 is expressed by 16 bits and stores the node ID-b of the origin IEEE 1394 terminal 6. The Ether type field 123 is expressed by 16 bits and stores a data indicating ARP.

The hardware type field 124 is expressed by 16 bits and stores a data indicating that the packet conforms to the IEEE 1394 Standard. The protocol type field 125 is expressed by 16 bits and stores a data indicating IP. The hardware address length field 126 is expressed by 8 bits and stores 16 as data indicating the length of the hardware address. The IP address length field 127 is expressed by 8 bits and stores 4 as data indicating the length of the IP address. The operation code field 128 is expressed by 16 bits and stores a code indicating the ARP request.

The origin unique ID field 129 is expressed by 64 bits and stores the unique ID-f of the IEEE 1394 terminal 6. The origin maximum payload field 130 is expressed by 8 bits and stores a data indicating the maximum payload of the IEEE 1394 terminal 6. The origin maximum transmission speed field 131 is expressed by 8 bits and stores a code indicating the maximum communication speed of the IEEE 1394 terminal 6. The origin unicast FIFO field 132 is expressed by 48 bits and stores the predetermined offset c of the IEEE 1394 terminal 6.

The origin IP address field 133 is expressed by 32 bits and stores the IP address B of the origin IEEE 1394 terminal 6. The destination IP address field 134 is expressed by 32 bits and stores the IP address A of the destination Ethernet terminal 5.

On the other hand, the fourth ARP request packet 42 shown in FIG. 7B includes a destination MAC address field 101, an origin MAC address field 102, an Ether type field 103, a hardware type field 104, a protocol type field 105, a hardware address length field 106, an IP address length field 107, an operation code field 108, an origin MAC address field 109, an origin IP address field 110, a destination MAC address field 111 and a destination IP address field 112, which are transmitted in the above mentioned order.

The destination MAC address field 101 is expressed by 48 bits and stores "ff:ff:ff:ff:ff:ff" that indicates broadcast. The origin MAC address field 102 is expressed by 48 bits and stores the pseudo MAC address B of the IEEE 1394 terminal 6 prepared by the address preparing section 15 of the bridge 4. The Ether type field 103 is expressed by 16 bits and stores a data indicating ARP.

The hardware type field 104 is expressed by 16 bits and stores a data indicating that the packet conforms to the Ethernet Standard. The protocol type field 105 is expressed by 16 bits and stores a data indicating IP. The hardware address length field 106 is expressed by 8 bits and stores 6 as data indicating the length of the hardware address. The IP address length field 107 is expressed by 8 bits and stores 4 as data indicating the length of the IP address. The operation code field 108 is expressed by 16 bits and stores a code indicating the ARP request.

The origin MAC address field 109 is expressed by 48 bits and stores the pseudo MAC address B of the origin IEEE 1394 terminal 6. The origin IP address field 110 is expressed by 32 bits and stores the IP address B of the origin IEEE 1394 terminal 6. The destination MAC address field 111 is expressed by 48 bits and stores NULL because the packet is an ARP request packet. The destination IP address field 112 is expressed by 32 bits and stores the IP address A of the destination Ethernet terminal 5.

Figure 8A:
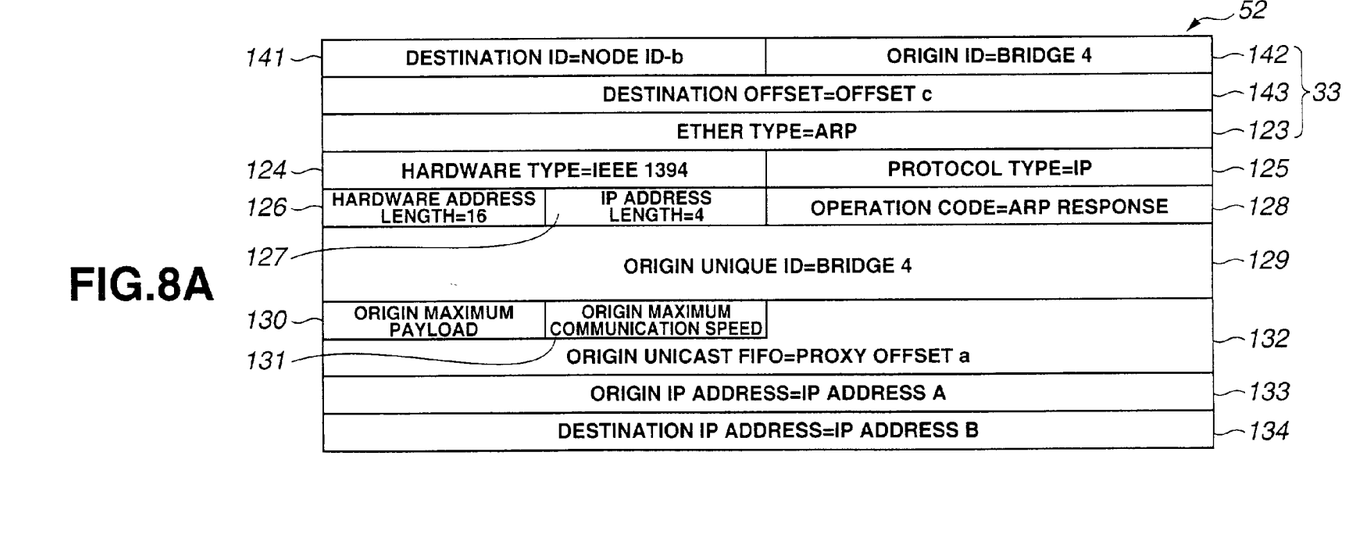
FIG. 8A illustrates the structure of a third ARP response packet that an Ethernet terminal transmits in response to a third ARP request packet and FIG. 8B illustrates the structure of a fourth ARP response packet newly prepared on the basis of the third ARP response packet.
Figure 8B:
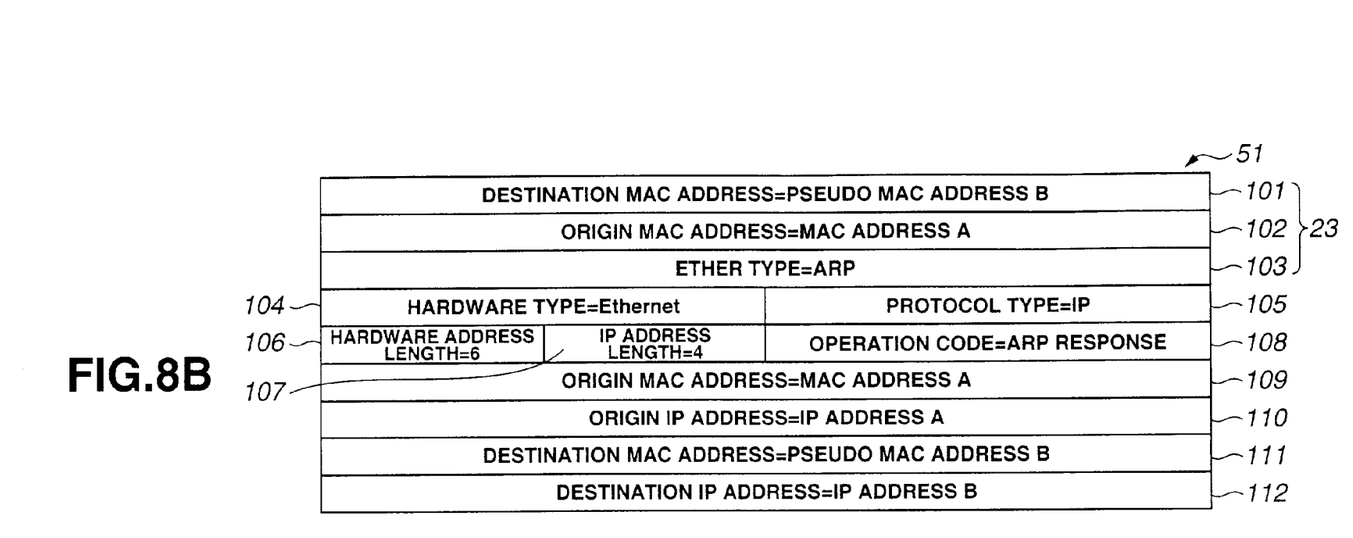

Now, the ARP response packet from the Ethernet subnetwork 2, for which the bridge 4 relays data, will be described below by referring to FIGS. 8A and 8B. FIG. 8A illustrates the structure of the third ARP response packet 51 transmitted from the Ethernet terminal 5 upon receiving the fourth ARP request packet 42. On the other hand, the fourth ARP response packet 52 that the packet preparing section 16 newly prepares on the basis of the third ARP response packet 51 received by the Ethernet interface 13 of the bridge 4 may typically have a structure as shown in FIG. 8B. The IEEE 1394 interface 14 of the bridge 4 transmits the fourth ARP response packet 52 to the IEEE 1394 terminal 6.

The third ARP response packet 51 shown in FIG. 8A includes a destination MAC address field 101, an origin MAC address field 102, an Ether type field 103, a hardware type field 104, a protocol type field 105, a hardware address length field 106, an IP address length field 107, an operation code field 108, an origin MAC address field 109, an origin IP address field 110, a destination MAC address field 111 and a destination IP address field 112, which are transmitted in the above mentioned order.

The destination MAC address field 101 is expressed by 48 bits and stores the pseudo MAC address B of the IEEE 1394 terminal 6. The origin MAC address field 102 is expressed by 48 bits and stores the MAC address A of the origin Ethernet terminal 5. The Ether type field 103 is expressed by 16 bits and stores a data indicating ARP.

The hardware type field 104 is expressed by 16 bits and stores a data indicating that the packet conforms to the Ethernet Standard. The protocol type field 105 is expressed by 16 bits and stores a data indicating IP. The hardware address length field 106 is expressed by 8 bits and stores 6 as data indicating the length of the hardware address. The IP address length field 107 is expressed by 8 bits and stores 4 as data indicating the length of the IP address. The operation code field 108 is expressed by 16 bits and stores a code indicating the ARP response.

The origin MAC address field 109 is expressed by 48 bits and stores the MAC address A of the origin Ethernet terminal 5. The origin IP address field 110 is expressed by 32 bits and stores the IP address A of the origin Ethernet terminal 5. The destination MAC address field 111 is expressed by 48 bits and stores the pseudo MAC address B of the destination IEEE 1394 terminal 6. The destination IP address field 112 is expressed by 32 bits and stores the IP address B of the destination IEEE 1394 terminal 6.

On the other hand, the fourth ARP response packet 52 shown in FIG. 8B includes a destination ID field 141, an origin ID field 142, a destination offset field 143, an Ether type field 123, a hardware type field 124, a protocol type field 125, a hardware address length field 126, an IP address length field 127, an operation code field 128, an origin unique ID field 129, an origin maximum payload field 130, an origin maximum communication speed field 131, an origin unicast FIFO field 132, an origin IP address field 133 and a destination IP address field 134, which are transmitted in the above mentioned order.

The destination ID field 141 is expressed by 16 bits and stores the node ID-b of the destination IEEE 1394 terminal 6. The origin ID field 142 is expressed by 16 bits and stores the node ID of the bridge 4. The destination offset field 143 is expressed by 48 bits and stores the predetermined offset c of the IEEE 1394 terminal 6. The Ether type field 123 is expressed by 16 bits and stores a data indicating ARP.

The hardware type field 124 is expressed by 16 bits and stores a data indicating that the packet conforms to the IEEE 1394 Standard. The protocol type field 125 is expressed by 16 bits and stores a data indicating IP. The hardware address length field 126 is expressed by 8 bits and stores 16 as data indicating the length of the hardware address. The IP address length field 127 is expressed by 8 bits and stores 4 as data indicating the length of the IP address. The operation code field 128 is expressed by 16 bits and stores a code indicating the ARP response.

The origin unique ID field 129 is expressed by 64 bits and stores the unique ID of the bridge 4. The origin maximum payload field 130 is expressed by 8 bits and stores the maximum payload of the bridge 4. The origin maximum communication speed field 131 is expressed by 8 bits and stores a code indicating the maximum communication speed of the bridge 4. The origin unicast FIFO field 132 is expressed by 48 bits and stores the proxy offset a generated by the bridge 4 with the corresponding MAC address A.

The origin IP address field 133 is expressed by 32 bits and stores the IP address A of the origin Ethernet terminal 5. The destination IP address field 134 is expressed by 32 bits and stores the IP address B of the destination IEEE 1394 terminal 6.

Figure 9:
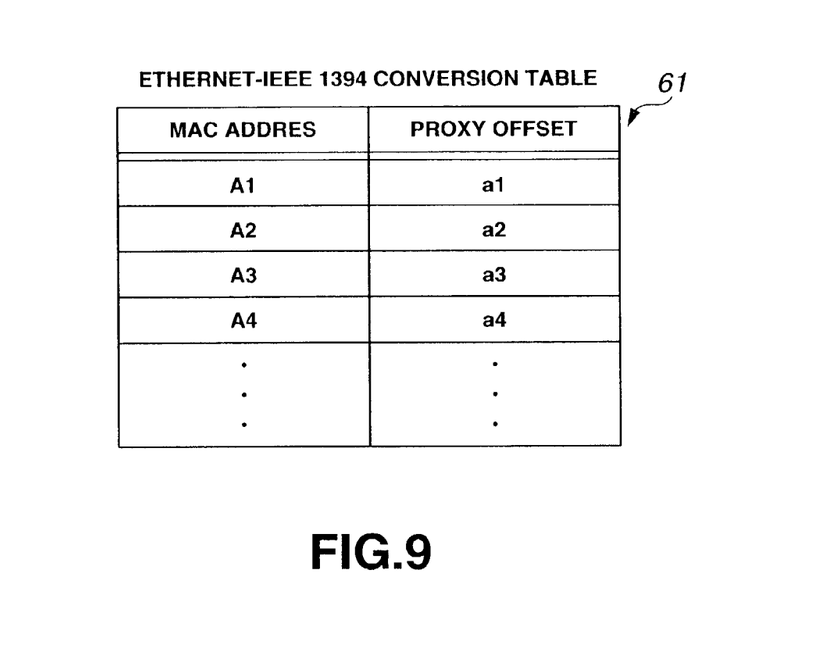
FIG. 9 is a schematic illustration of the Ethernet—IEEE 1394 conversion table memorized in the memory of the bridge.

Now, an Ethernet—IEEE 1394 conversion table 61 where the proxy offsets prepared by the bridge 4 and the corresponding MAC addresses are listed will be described by referring to FIG. 9.

The Ethernet—IEEE 1394 conversion table 61 is stored in the memory 12 and referred to when a packet to be transmitted by way of the IEEE 1394 subnetwork 3 is prepared on the basis of the packet transmitted by way of the Ethernet subnetwork 2. The Ethernet—IEEE 1394 conversion table 61 stores proxy offsets a1, a2, . . . prepared by the CPU 11 of the bridge 4 with the corresponding MAC addresses A1, A2, . . . of the computer terminals connected to the Ethernet subnetwork 2.

As the Ethernet interface 13 of the bridge 4 receives the first ARP request packet 21, the CPU 11 determines if the MAC address stored in the first ARP request packet 21 is already found in the Ethernet—IEEE 1394 conversion table 61 or not. If the MAC address is not found in the conversion table, the CPU 11 prepares a proxy offset that is not a duplicate of any of the proxy offsets a1, a2, . . . already existing on the Ethernet—IEEE 1394 conversion table 61 and stores it in the memory 12 with the corresponding MAC address.

If any of the MAC addresses existing on the Ethernet—IEEE 1394 conversion table 61 is not accessed in a predetermined period of time, the CPU 11 erases the MAC address and the corresponding proxy offset.

Figure 10:
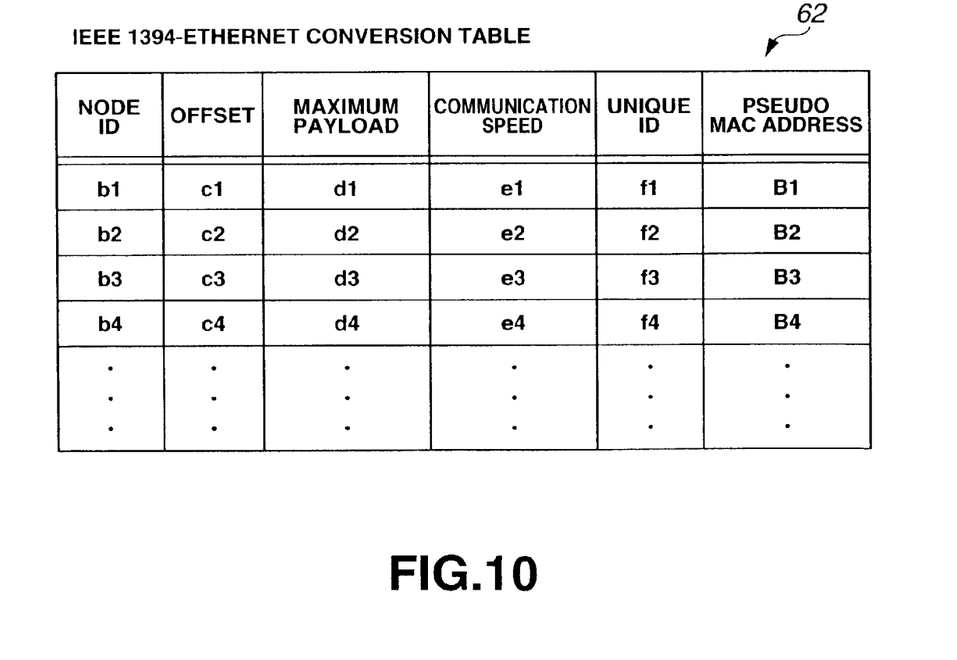
FIG. 10 is a schematic illustration of the IEEE 1394—Ethernet conversion table memorized in the memory of the bridge.

Now, an IEEE 1394—Ethernet conversion table 62 where node IDs, offsets, maximum payloads, maximum communication speeds and unique IDs are listed with the corresponding pseudo MAC addresses prepared by the address preparing section 15 of the bridge 4 will be described by referring to FIG. 10.

The IEEE 1394—Ethernet conversion table 62 is stored in the memory 12 and referred to when a packet to be transmitted by way of the Ethernet subnetwork 2 is prepared on the basis of the packet transmitted by way of the IEEE 1394 subnetwork 3. The IEEE 1394—Ethernet conversion table 62 stores node IDs b1, b2, . . . , offsets c1, c2, . . . , maximum payloads d1, d2, . . . , maximum communication speeds e1, e2, . . . and unique IDs f1, f2, . . . , with the corresponding pseudo MAC addresses B1, B2 prepared by the address preparing section 15 of the bridge 4.

As the IEEE 1394 interface 14 of the bridge 4 receives the third ARP request packet 41, the CPU 11 determines if a line whose node ID and offset agree respectively with those stored in the third ARP request packet 41 is found in the IEEE 1394—Ethernet conversion table 62 or not. If such a line is not found in the conversion table, the CPU 11 prepares a pseudo MAC address that is not a duplicate of any of the pseudo MAC addresses B1, B2, . . . already existing on the IEEE 1394—Ethernet conversion table 62 and stores it in the memory 12 with the corresponding node ID and the offset as described earlier by referring to FIG. 4.

If any of the combinations of node IDs and offsets existing on the IEEE 1394—Ethernet conversion table 62 is not accessed in a predetermined period of time, the CPU 11 erases data corresponding to the node ID and the offset.

Figure 11:
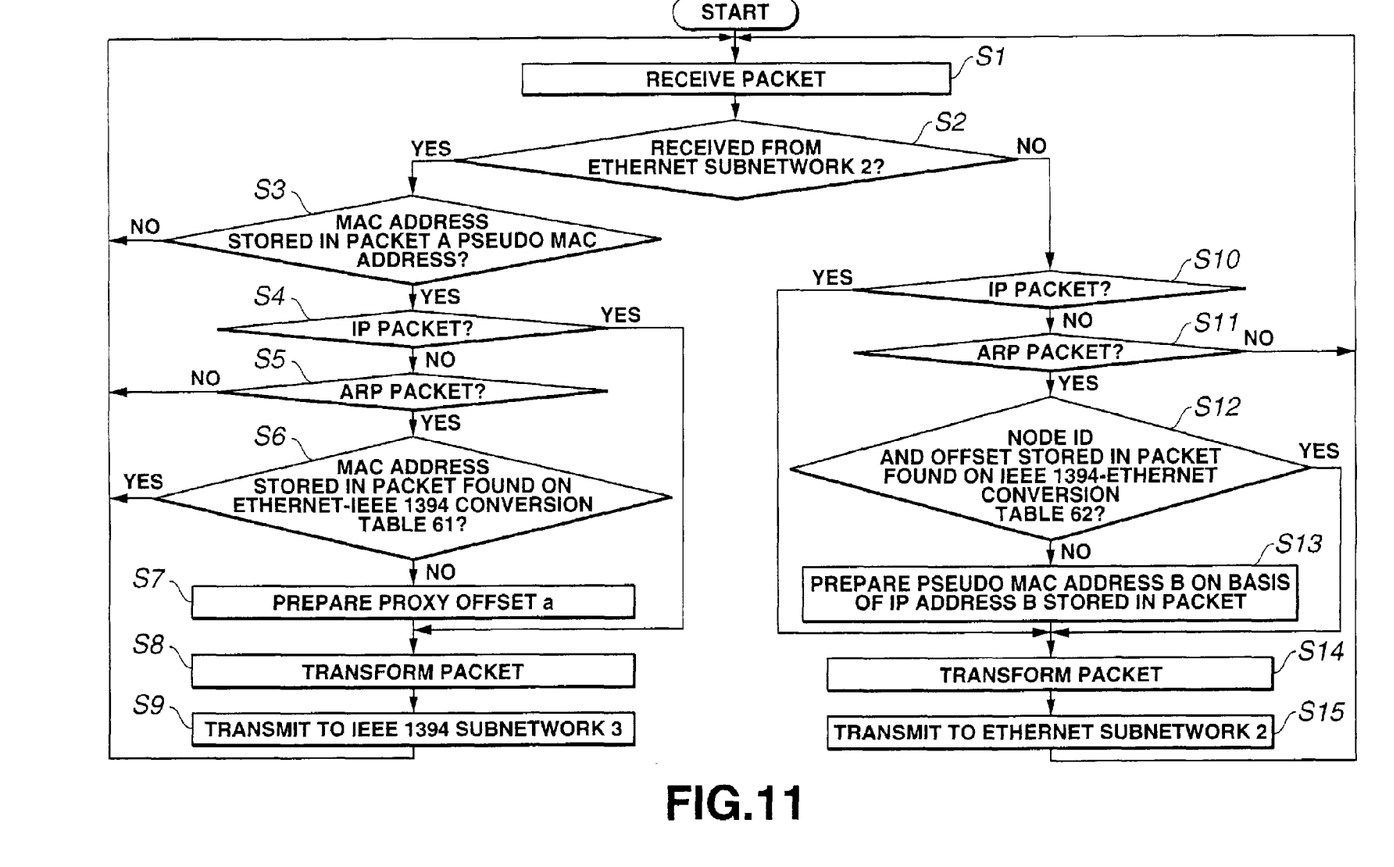
FIG. 11 is a flow chart of the communication processing operation of the bridge.

Now, the processing operation that the bridge 4 performs for transmission and reception of a packet between the Ethernet subnetwork 2 and the IEEE 1394 subnetwork 3 will be described by referring to the flow chart of FIG. 11. Firstly, in Step S1, the Ethernet interface 13 of the bridge 4 receives a packet from the Ethernet subnetwork 2 or the IEEE 1394 interface 14 receives a packet from the IEEE 1394 subnetwork 3.

In Step S2, the CPU 11 determines if the packet is received by the Ethernet interface 13 or by the IEEE 1394 interface 14 on the basis of the signal output from the Ethernet interface 13 or the IEEE 1394 interface 14. The CPU 11 proceeds to Step S3 when the packet is received by the Ethernet interface 13, whereas it proceeds to Step S10 when the packet is received not by the Ethernet interface 13 but by the IEEE 1394 interface 14.

In Step S3, the CPU 11 determines if the MAC address stored in the destination MAC address field 101 of the received packet is a pseudo MAC address or not. If the MAC address stored in the destination MAC address field 101 is a pseudo MAC address, the CPU 11 proceeds to Step S4. If, on the other hand, the MAC address stored in the destination MAC address field 101 is not a pseudo MAC address, the CPU returns to Step S1 and repeats the above steps because the packet is not to be transmitted to the IEEE 1394 subnetwork 3.

In Step S4, the CPU 11 determines if the received packet is an IP packet or not on the basis of the data stored in the Ether type field 103 of the packet. The CPU 11 proceeds to Step S5 if the received packet is not an IP packet, whereas it proceeds to Step S8 if the received packet is an IP packet.

In Step S5, the CPU 11 determines if the received packet is an ARP packet or not on the basis of the data stored in the Ether type field 103 of the packet. The CPU 11 proceeds to Step S6 if the received packet is an ARP packet, whereas it returns to Step S1 and repeats the above steps because the bridge 4 cannot process the packet.

In Step S6, the CPU 11 determines if the MAC address stored in the origin MAC address field 102 of the received packet is already found on the Ethernet—IEEE 1394 conversion table 61 or not. The CPU 11 proceeds to Step S7 if the MAC address is not found on the Ethernet—IEEE 1394 conversion table 61, whereas it proceeds to Step S8 if the MAC address is found on the Ethernet—IEEE 1394 conversion table 61.

In Step S7, the CPU prepares a proxy offset that corresponds to the MAC address stored in the origin MAC address field of the packet and stores it in the Ethernet—IEEE 1394 conversion table 61.

In Step S8, the packet preparing section 16 transforms the received packet into a second ARP request packet 22 if the received packet is an ARP packet and found to be the first ARP request packet 21, whereas it transforms the received packet into a fourth ARP response packet 52 if the received packet is an ARP packet and found to be the third response packet 51. If, on the other hand, the received packet is an IP packet, the packet preparing section 16 transforms it, adding the first IEEE 1394 header 24 or the second IEEE 1394 header 33.

In Step S9, the CPU 11 causes the IEEE 1394 interface 14 to transmit the packet prepared in Step S8 to the IEEE 1394 subnetwork 3 and returns to Step S1 to repeat the above described steps.

If, on the other hand, the CPU 11 determines in Step S2 that the packet is received by the IEEE 1394 interface 14, it then determines in Step S10 if the received packet is an IP packet or not on the basis of the data stored in the Ether type field 123 of the packet. The CPU 11 proceeds to Step S11 if the received packet is not an IP packet, whereas it proceeds to Step S14 if the received packet is an IP packet.

In Step S11, the CPU 11 determines if the received packet is an ARP packet or not on the basis of the data stored in the Ether type field 123 of the packet. Then, the CPU 11 proceeds to Step S12 if the received packet is an ARP packet, whereas it returns to Step S1 and repeats the above described steps if the received packet is not an ARP packet because the bridge 4 cannot process the packet.

Then, in Step S12, the CPU 11 determines if the node ID stored in the origin ID field 142 and the offset stored in the destination offset field 143 of the packet are found on the IEEE 1394—Ethernet conversion table 62 or not. The CPU 11 proceeds to Step S13 if the node ID and the offset are not found on the IEEE 1394—Ethernet conversion table 62, whereas it proceeds to Step S14 if the node ID and the offset are found on the IEEE 1394—Ethernet conversion table 62.

In Step S13, the address preparing section 15 prepares a pseudo MAC address that corresponds to the node ID stored in the origin ID field 142 and the offset stored in the destination offset field 143 and stores them in the IEEE 1394—Ethernet conversion table 62. At this time, the address preparing section 15 prepares the pseudo MAC address B by changing the IP address B of the IEEE 1394 terminal 6 stored in the origin IP address field 133 from a decimal number to a hexadecimal number and localizing the L-bit.

In Step S14, the packet preparing section 16 transforms the received packet into a second ARP response packet 32 if the packet is an ARP packet and found to be the first ARP response packet 31, whereas it transforms the received packet into a fourth ARP request packet 42 if the packet is the third ARP request packet 41. If, on the other hand, the received packet is an IP packet, the packet preparing section 16 transforms it, adding the Ethernet header 23.

In Step S15, the CPU 11 causes the Ethernet interface 13 to transmit the packet prepared in Step S14 to the Ethernet subnetwork 2 and then returns to Step S1 to repeat the above described steps.

As described above in detail, the bridge 4 realized by applying the present invention is adapted to prepare a pseudo MAC address B on the basis of the IP address B of the IEEE 1394 terminal 6 stored in the first ARP response packet 31 or the third ARP request packet 41 received from the IEEE 1394 subnetwork 3 so that it is no longer necessary to constantly hold a large number of MAC addresses that may be simply wasted.

Additionally, if there is an bridge other than the bridge 4, the latter can assign a same pseudo MAC address B to the single IEEE 1394 terminal 6 without communicating with the former bridge in a specific way.

It will be appreciated that the present invention is by no means limited to the above described embodiment, which may be modified or altered in various different ways without departing from the scope of the present invention.

For instance, while an IEEE 802 subnetwork is described above in terms of an Ethernet subnetwork 2, it may alternatively be a wireless LAN conforming to the IEEE 802 Standard.

What is claimed is:

1. A communication device adapted to packet communications between a first terminal connected to a first network and a second terminal connected to a second network, said device comprising:
 a physical address preparing means for preparing a pseudo physical address of said first terminal or that of said second terminal on the basis of a theoretical address without a physical address being assigned to said first terminal or said second terminal, whichever appropriate, and stored in the received ARP (Address Resolution Protocol) packet;
 a memory means for storing the pseudo physical address prepared by said physical address preparing means; and
 a packet preparing means for preparing a new packet storing said pseudo physical address memorized in said memory means,
  wherein said physical address preparing means prepares a pseudo physical address by changing the theoretical address stored in the ARP packet and adding information indicating local address assignment in said first network or said second network, and
  wherein said pseudo physical address on said memory is erased if said pseudo physical address is not accessed in a predetermined period of time.

2. The device according to claim 1, wherein said theoretical address is an IP (Internet protocol) address expressed by 32 bits and said physical address is a MAC (media access control) address expressed by 48 bits.

3. The device according to claim 1, wherein said first network conforms to the IEEE (Institute of Electrical and Electronics Engineers) 802 Standard and said second network conforms to the IEEE 1394 Standard.

4. The device according to claim 1, wherein said first network conforms to the IEEE 1394 Standard and said second network conforms to the IEEE 802 Standard.

5. A communication method adapted to packet communications between a first terminal connected to a first network and a second terminal connected to a second network, said method comprising:
 a physical address preparing step of preparing a pseudo physical address of said first terminal or that of said second terminal on the basis of a theoretical address without a physical address being assigned to said first terminal or said second terminal, whichever appropriate, and stored in the received ARP (Address Resolution Protocol) packet;

a storage controlling step of causing a memory means to memorize the pseudo physical address prepared in said physical address preparing step; and a packet preparing step of preparing a new packet storing said pseudo physical address memorized in said memory means in said storage controlling step, wherein a pseudo physical address is prepared in said physical address preparing step by changing the theoretical address stored in the ARP packet and adding information indicating local address assignment in said first network or said second network, and wherein said pseudo physical address on said memory is erased if said pseudo physical address is not accessed in a predetermined period of time.

6. The method according to claim 5, wherein said theoretical address is an IP (Internet protocol) address expressed by 32 bits and said physical address is a MAC (media access control) address expressed by 48 bits.

7. The method according to claim 5, wherein said first network conforms to the IEEE (Institute of Electrical and Electronics Engineers) 802 Standard and said second network conforms to the IEEE 1394 Standard.

8. The method according to claim 5, wherein said first network conforms to the IEEE 1394 Standard and said second network conforms to the IEEE 802 Standard.

* * * * *